United States Patent
Ahn

(10) Patent No.: US 10,862,664 B2
(45) Date of Patent: Dec. 8, 2020

(54) RECEIVER AND TRANSCEIVER INCLUDING THE SAME

(71) Applicant: Samsung Display Co., Ltd., Yongin-si, Gyeonggi-do (KR)

(72) Inventor: Jeong Keun Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/439,648

(22) Filed: Jun. 12, 2019

(65) Prior Publication Data

US 2020/0092075 A1 Mar. 19, 2020

(30) Foreign Application Priority Data

Sep. 18, 2018 (KR) .......................... 10-2018-0111789

(51) Int. Cl.
*H04L 7/00* (2006.01)
*H04L 7/027* (2006.01)

(52) U.S. Cl.
CPC ............ *H04L 7/0079* (2013.01); *H04L 7/027* (2013.01)

(58) Field of Classification Search
CPC ....... H04L 7/0079; H04L 7/027; H04L 7/033; H04L 25/14; H04L 7/0331
USPC .................. 375/355, 356; 327/141, 144, 152
See application file for complete search history.

(56) References Cited

U.S. PATENT DOCUMENTS

| | | | |
|---|---|---|---|
| 6,167,077 A * | 12/2000 | Ducaroir | H04L 1/24 370/476 |
| 7,907,693 B2 | 3/2011 | Bae et al. | |
| 9,036,757 B1 * | 5/2015 | Su | H04L 25/03 375/355 |
| 2007/0297552 A1 * | 12/2007 | Bae | H04L 7/10 375/371 |
| 2009/0103572 A1 * | 4/2009 | Zerbe | H04L 25/14 370/503 |
| 2016/0056859 A1 * | 2/2016 | Malhotra | H04L 7/0008 375/356 |
| 2019/0074863 A1 | 3/2019 | Ahn | |

FOREIGN PATENT DOCUMENTS

KR 10-0915387 B1 9/2009
KR 10-2019-0027983 A 3/2019

* cited by examiner

Primary Examiner — Tesfaldet Bocure
(74) Attorney, Agent, or Firm — Lewis Roca Rothgerber Christie LLP

(57) ABSTRACT

A receiver may include a plurality of receiving units connected with corresponding channels, and a clock data recovery unit connected with a sensing channel among the channels via a sensing line and connected with the receiving units via a common clock line. The receiving units may receive training pattern signals having the same transition direction through the channels in a training mode, and, in the training mode the clock data recovery unit may generate a phase-adjusted sampling clock signal so that a sampling time corresponds to a transition time of a training pattern signal of the sensing channel.

19 Claims, 13 Drawing Sheets

FIG. 6
CH1 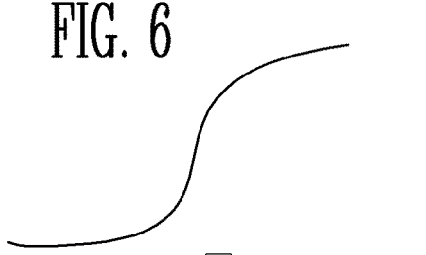
CH2 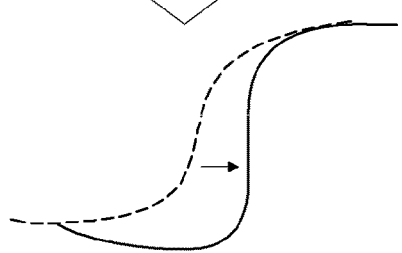
FIG. 7
CH1 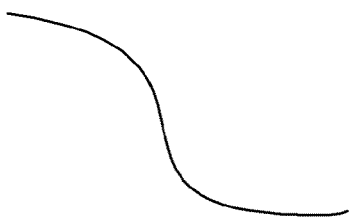
CH2 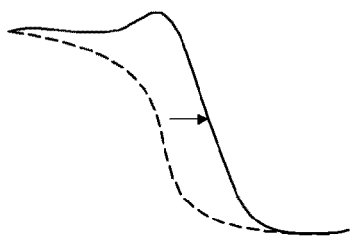

RECEIVER AND TRANSCEIVER INCLUDING THE SAME

CROSS-REFERENCE TO RELATED APPLICATION

This application claims priority to and the benefit of Korean patent application number 10-2018-0111789 filed on Sep. 18, 2018, the entire disclosure of which is incorporated herein in its entirety by reference.

BACKGROUND

1. Field

Aspects of some example embodiments of the present disclosure relate to a receiver and a transceiver including the receiver.

2. Description of the Related Art

A primary type of noise that can lead to degradation of a signal in a transceiving system, in which a transmitter and a receiver are connected via a single channel, is inter-symbol interference (ISI).

However, a high-speed parallel link system in which a transmitter and a receiver are connected via a plurality of channels may generate a crosstalk-induced jitter (CIJ) as well as the inter-symbol interference.

Further, because the receiver may use a plurality of clock data recovery units corresponding to the plurality of channels, respectively, a large chip area may be required for the clock data recovery units, in addition to increasing power consumption and configuration costs.

The Background section of the present Specification includes information that is intended to provide context to example embodiments, and the information in the present Background section does not necessarily constitute prior art.

SUMMARY

Aspects of some example embodiments of the present disclosure are directed to a receiver and a transceiver including the receiver, capable of minimizing or reducing a chip area of a clock data recovery unit while effectively eliminating or reducing a crosstalk-induced jitter and inter-symbol interference.

Furthermore, aspects of some example embodiments of the present disclosure may include a receiver including receiving units connected with corresponding channels; and a clock data recovery unit connected with a sensing channel among the channels via a sensing line, and connected with the receiving units via a common clock line, wherein the receiving units receive training pattern signals having the same transition direction through the channels in a training mode, and, in the training mode, the clock data recovery unit generates a phase-adjusted sampling clock signal so that a sampling time corresponds to a transition time of a training pattern signal of the sensing channel.

The clock data recovery unit may supply the sampling clock signal through the common clock line to the receiving units in a normal mode, and the receiving units may sample each of data signals received through the corresponding channels using the sampling clock signal in the normal mode.

The clock data recovery unit may include a transition detection unit configured to provide a mode signal corresponding to the training mode or the normal mode, based on the training pattern signal and a compensated clock signal.

The clock data recovery unit may further include a phase correction unit configured to generate at least one of the compensated clock signal and the sampling clock signal, based on the mode signal and an external clock signal.

The transition detection unit may provide the mode signal corresponding to the training mode when the training pattern signal is inputted, and the phase correction unit may correct a phase of the external clock signal to generate the compensated clock signal when the mode signal corresponding to the training mode is inputted.

The transition detection unit may provide the mode signal corresponding to the normal mode in the case of success in detecting the transition time of the training pattern signal based on the compensated clock signal, in the training mode, and the transition detection unit may provide the mode signal corresponding to the training mode in the case of failing in detecting the transition time of the training pattern signal based on the compensated clock signal, in the training mode.

The phase correction unit may re-correct the phase of the external clock signal to generate the compensated clock signal when the training mode is maintained, and the phase correction unit may generate the sampling clock signal having the same phase as the current compensated clock signal when the training mode is terminated and the normal mode is started.

The sensing channel may be a channel that receives a receiving signal having the slowest phase for the same transmitting signals among the channels.

The sensing channel may be a channel that is located in the middle of the channels.

Each of the receiving units may include a first comparator comparing the data signal with a first reference voltage in response to the sampling clock signal, thus providing a logic value; a second comparator comparing the data signal with a second reference voltage in response to the sampling clock signal, thus providing a logic value; and a multiplexer configured to output one of output values of the first and second comparators, as current data.

The multiplexer may select one of the output values of the first and second comparators based on past data before a 1 UI (unit interval), thus outputting the output value as the current data.

The first reference voltage may have a value between the highest level and an intermediate level among variable levels of the data signal, and the second reference voltage may have a value between the lowest level and the intermediate level among variable levels of the data signal.

The first comparator may provide a high level of logic value if the data signal is larger than the first reference voltage, and may provide a low level of logic value if the data signal is smaller than the first reference voltage, and the second comparator may provide a high level of logic value if the data signal is larger than the second reference voltage, and may provide a low level of logic value if the data signal is smaller than the second reference voltage.

A binary level of the current data may be 1 when the output value of the multiplexer is the high level of logic value, and a binary level of the current data may be 0 when the output value of the multiplexer is the low level of logic value.

The receiving signal may be a duo-binary signal.

Each of the channels may be designed as a low pass filter.

According to some example embodiments of the present disclosure, a receiver includes: receiving units connected with corresponding channels; and a clock data recovery unit connected with a sensing channel among the channels via a sensing line, and connected with the receiving units via a common clock line, wherein the receiving units receive first training pattern signals having the same first transition direction and second training pattern signals having the same second transition direction through the channels in a training mode, the clock data recovery unit generates a sampling clock signal to correspond to a more delayed phase among a first sampling time corresponding to a first transition time of a first training pattern signal and a second sampling time corresponding to a second transition time of a second training pattern signal of the sensing channel in the training mode, the first transition direction and the second transition direction are different from each other.

The clock data recovery unit may supply the sampling clock signal through the common clock line to the receiving units in a normal mode, and the receiving units may sample each of data signals received through the corresponding channels using the sampling clock signal in the normal mode.

The present disclosure provides a transceiver including transmitting units connected with corresponding channels; receiving units connected with the corresponding channels; and a clock data recovery unit connected with a sensing channel among the channels via a sensing line, connected with the receiving units via a common clock line, and connected with the transmitting units via the common mode line, wherein the receiving units receive training pattern signals having the same transition direction through the channels in a training mode, and, in the training mode, the clock data recovery unit generates a phase-adjusted sampling clock signal so that a sampling time corresponds to a transition time of a training pattern signal of the sensing channel, and provides a mode signal corresponding to a normal mode through the common mode line when the sampling clock signal is generated, and the transmitting units provide each data signal through the corresponding channels, in the case of receiving the mode signal corresponding to the normal mode.

The clock data recovery unit may supply the sampling clock signal through the common clock line to the receiving units in the normal mode, and the receiving units may sample each of the data signals received through the corresponding channels using the sampling clock signal in the normal mode.

BRIEF DESCRIPTION OF THE DRAWINGS

FIG. 6 is a view illustrating a crosstalk-induced jitter generated by the adjacent receiving signal.

FIG. 7 is a view illustrating another example of a crosstalk-induced jitter generated by the adjacent receiving signal.

DETAILED DESCRIPTION

Figure 1:
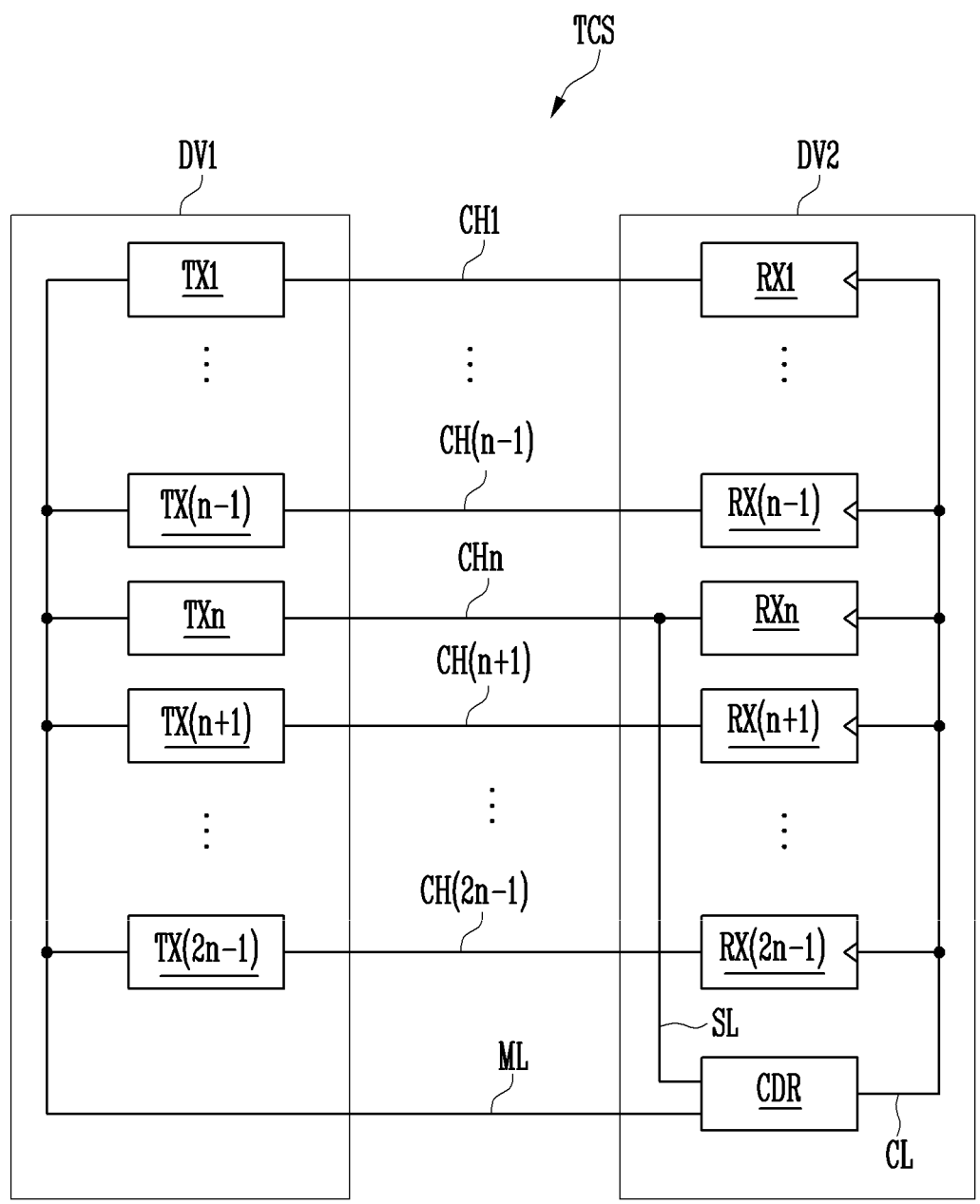
FIG. 1 is a view illustrating a receiver and a transceiver including the receiver according to some example embodiments of the present disclosure.

Aspects of some example embodiments will now be described more fully hereinafter with reference to the accompanying drawings; however, they may be embodied in different forms and should not be construed as limited to the embodiments set forth herein.

For the purpose of clarity, descriptions of certain aspects that are not necessary to understand the embodiments may be omitted herein, and like reference numerals refer to like elements throughout. Therefore, the above-mentioned reference numerals may be used in other drawings.

Because the sizes and thicknesses of respective components shown in the drawings are arbitrarily shown for convenience of explanation, the present disclosure is not limited to those shown in the drawings. In order to clearly represent several layers and regions in the drawings, thicknesses may be exaggerated.

FIG. 1 is a view illustrating a receiver and a transceiver including the receiver according to some example embodiments of the present disclosure.

Referring to FIG. 1, the transceiver (TCS) according to some example embodiments of the present disclosure includes a transmitter (DV1) and a receiver (DV2).

The transmitter (DV1) includes transmitting units (or transmitters, or transmitting circuits) (TX1-TX(2n−1)) connected with corresponding channels (CH1-CH(2n−1)).

The receiver (DV2) includes receiving units (or receivers, or receiving circuits) (RX1-RX(2n−1)) connected with the corresponding channels (CH1-CH(2n−1)).

Further, the receiver (DV2) includes a clock data recovery unit (or clock data recovery circuit) (CDR). The clock data recovery unit (CDR) may be connected with a sensing channel (CHn) among the channels (CH1-CH(2n−1)) via a sensing line (SL), and may be connected with the receiving units (RX1-RX(2n−1)) via a common clock line (CL). According to some example embodiments, the clock data recovery unit (CDR) may be connected with transmitting units (TX1-TX(2n−1)) via a common mode line (ML).

The transceiver (TCS) may be operated in either of a training mode and a normal mode. The training mode is a mode in which the clock data recovery unit (CDR) generates a sampling clock signal, and the normal mode is a mode for sampling data signals using the generated sampling clock signal. Training pattern signals may be transmitted through the channels (CH1-CH(2n-1)) during the training mode, and data signals may be transmitted through the channels (CH1-CH(2n-1)) during the normal mode.

First, the training mode will be described.

In some example embodiments, the receiving units (RX1-RX(2n-1)) may receive the training pattern signals having the same transition direction through the channels (CH1-CH(2n-1)) in the training mode.

At this time, the clock data recovery unit (CDR) may generate a phase-adjusted sampling clock signal so that a sampling time corresponds to a transition time of the training pattern signal of the sensing channel (CHn) in the training mode.

According to some example embodiments, the clock data recovery unit (CDR) may provide a mode signal corresponding to the normal mode through the common mode line (ML) when the sampling clock signal is generated.

In some example embodiments, the receiving units (RX1-RX(2n-1)) may receive first training pattern signals having the same first transition direction and second training pattern signals having the same second transition direction through the channels (CH1-CH(2n-1)) in the training mode. Here, the first transition direction and the second transition direction may be different from each other.

At this time, the clock data recovery unit (CDR) may generate a sampling clock signal to correspond to a more delayed phase among a first sampling time corresponding to a first transition time of a first training pattern signal and a second sampling time corresponding to a second transition time of a second training pattern signal of the sensing channel in the training mode.

Next, the normal mode will be described.

The transmitting units (TX1-TX(2n-1)) may provide each data signal through the corresponding channels (CH1-CH(2n-1)), in the case of receiving the mode signal corresponding to the normal mode.

The clock data recovery unit (CDR) may supply the sampling clock signal through the common clock line (CL) to the receiving units (RX1-RX(2n-1)) in the normal mode.

The receiving units (RX1-RX(2n-1)) may sample each of the data signals received through the corresponding channels (CH1-CH(2n-1)) using the sampling clock signal in the normal mode.

According to some example embodiments, because the clock data recovery units are not required for the respective channels (CH1-CH(2n-1)) and only one clock data recovery unit (CDR) is required for the sensing channel (CHn), it is possible to reduce a required chip area and power consumption.

Although the sampling clock signal is generated for a plurality of channels (CH1-CH(2n-1)) based on one sensing channel (CHn), there is no problem in data sampling, which will be described below with reference to FIGS. 11 to 14.

Here, it is important to determine the sensing channel (CHn) among the plurality of channels (CH1-CH(2n-1)). According to some example embodiments, the sensing channel (CHn) may be a channel that receives the receiving signal having the slowest phase for the same transmitting signals among the channels (CH1-CH(2n-1)). According to some example embodiments, the sensing channel (CHn) may be a channel that is located in the middle of the channels (CH1-CH(2n-1)).

Here, n may be a natural number of 2 or more. Although the last channel (CH(2n-1)) is shown in FIG. 1 as a 2n-1-th channel, namely, an odd-numbered channel, some example embodiments may be applied to a case where the last channel is an even-numbered channel. For example, the last channel may be a 2n-th channel. For example, if the sensing channel (CHn) is a 4th channel, the last channel may be an 8th channel. Further, if the last channel is the 8th channel, the sensing channel (CHn) may be a 5th channel.

That is, when determining the sensing channel (CHn) of the present embodiment, it is not important to determine what numberth channel is employed as the sensing channel, but it is important to determine the channel that receives the receiving signal having the slowest phase for the same transmitting signals among the channels (CH1-CH(2n-1)), as the sensing channel (CHn).

If the physical structure of the channels (CH1-CH(2n-1)) is simply arranged in parallel on a plane, the sensing channel (CHn) may be a channel that is located in the middle of the channels (CH1-CH(2n-1)). However, if the channels (CH1-CH(2n-1)) are provided in a three-dimensional structure (e.g., if a plurality of channels is present as a bundle within a wire sheath), a manufacturer may identify a channel that receives the receiving signal having the slowest phase by previously transmitting sample training signals, and then determine such a channel as the sensing channel (CHn). That is, a different sensing channel (CHn) may be determined for each product.

Further, according to some example embodiments, the crosstalk-induced jitter may be effectively eliminated or reduced as described in more detail below with reference to FIGS. 6 to 14, and the inter-symbol interference may be effectively eliminated or reduced as described in more detail below with reference to FIGS. 16 and 17.

Figure 2:
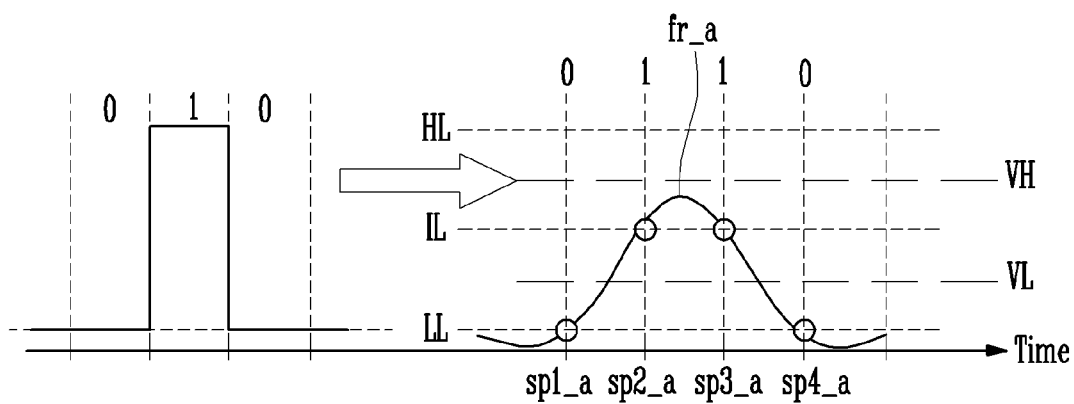
FIG. 2 is a view illustrating a receiving signal for a transmitting signal.
Figure 3:
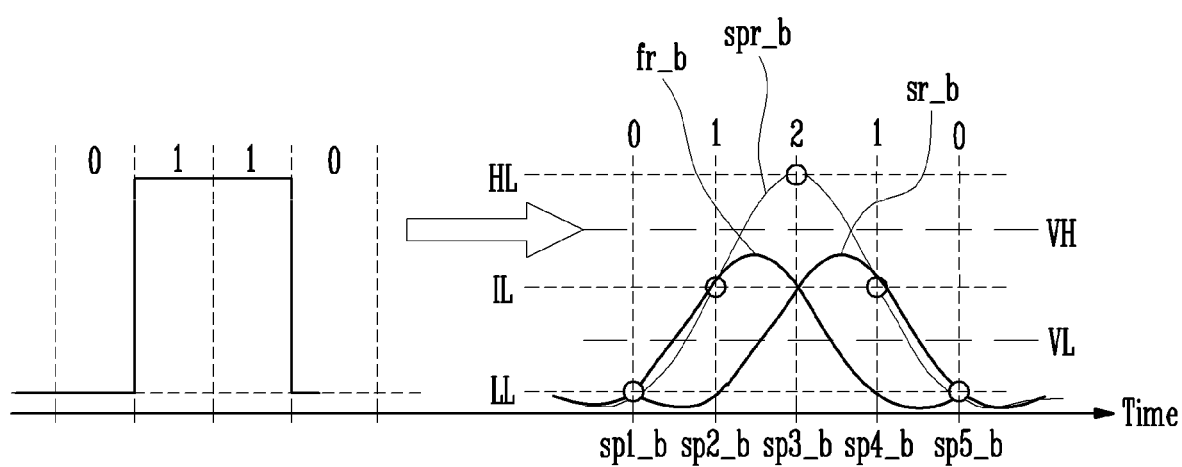
FIG. 3 is a view illustrating a receiving signal for another transmitting signal.

FIG. 2 is a view illustrating a receiving signal for a transmitting signal, and FIG. 3 is a view illustrating a receiving signal for another transmitting signal.

It is assumed in FIGS. 2 and 3 that there is no crosstalk-induced jitter. In FIGS. 2 and 3, an interval between adjacent sampling times is 1 UI (unit interval).

Referring to FIGS. 2 and 3, a variable level of the receiving signal may be one of the lowest level (LL) or more and the highest level (HL) or less. There is an intermediate level (IL) between the lowest level (LL) and the highest level (HL).

Referring to FIG. 2, when the transmitter (DV1) transmits a transmitting signal having a binary level of 0, 1, 0 through any one channel, a receiving signal (fr_a) of the receiver (DV2) passing through the channel is illustrated. It is assumed that the remaining data of the transmitting signal that is not shown in FIG. 3 has a binary level of 0.

The form of the receiving signal (fr_a) shown in FIG. 2 may be obtained when the channel is designed as a low pass filter. Thus, according to some example embodiments, each of the plurality of channels (CH1-CH(2n-1)) connecting the transmitter (DV1) with the receiver (DV2) may be designed as the low pass filter.

The receiving signal following the response form of FIG. 2 may be referred to as a duo-binary signal. It is possible to obtain the response form of FIG. 2 when the channel is designed as the low pass filter as well as when the transmitter (DV1) is equipped with an encoder for the duo-binary signal.

There have been proposed a variety of duo-binary signaling methods. However, in the case of the receiving signal (fr_a) of FIG. 2, generally, a cursor of a sampling time (sp1_a) becomes a pre-cursor, a cursor of a sampling time (sp2_a) becomes a main-cursor, a cursor of a sampling time (sp3_a) becomes a first post-cursor, and a cursor of a sampling time (sp4_a) becomes a second post-cursor. In order to appropriately apply the duo-binary signaling, various methods known to those skilled in the art may be used to match a level of the main-cursor with that of the first post-cursor.

Referring to FIG. 3, when the transmitter (DV1) transmits a transmitting signal having a binary level of 0, 1, 1, 0 through any one channel, a receiving signal (spr_b) of the receiver (DV2) passing through the channel is illustrated. It is assumed that the remaining data of the transmitting signal that is not shown in FIG. 3 has a binary level of 0.

In FIG. 3, the receiving signal (spr_b) may be an overlap signal of a response signal (fr_b) corresponding to the first binary level 1 and a response signal (sr_b) corresponding to the second binary level 1. In the case of the response signal (fr_b), generally, a cursor of a sampling time (sp1_b) becomes a pre-cursor, a cursor of a sampling time (sp2_b) becomes a main-cursor, a cursor of a sampling time (sp3_b) becomes a first post-cursor, and a cursor of a sampling time (sp4_b) becomes a second post-cursor. In the case of the response signal (sr_b), generally, a cursor of a sampling time (sp2_b) becomes a pre-cursor, a cursor of a sampling time (sp3_b) becomes a main-cursor, a cursor of a sampling time (sp4_b) becomes a first post-cursor, and a cursor of a sampling time (sp5_b) becomes a second post-cursor.

Hereinafter, a method of decoding a duo-binary signal will be described in more detail with reference to FIGS. 2 and 3.

When the decoding for the duo-binary signal is performed, a determined value of data before 1 UI may be required. When the determined value of data before 1 UI is equal to 1, the first reference voltage (VH) may be used to determine current data. Further, when the determined value of data before 1 UI is equal to 0, the second reference voltage (VL) may be used to determine the current data. The first reference voltage (VH) may have an intermediate value between the highest level (HL) and the intermediate level (IL) among variable levels of the receiving signal. The second reference voltage (VL) may have an intermediate value between the lowest level (LL) and the intermediate level (IL) among variable levels of the receiving signal.

For example, referring to FIG. 2, in the sampling time (sp2_a), because the determined value of data before 1 UI is equal to 0, the binary level of the current data may be determined based on the second reference voltage (VL). Because the level of the receiving signal sampled in the sampling time (sp2_a) is higher than the second reference voltage (VL) as the intermediate level (IL), the binary level may be determined to be 1.

Next, referring to FIG. 2, in the sampling time (sp3_a), because the determined value of data before 1 UI is equal to 1, the binary level of the current data may be determined based on the first reference voltage (VH). Because the level of the receiving signal sampled in the sampling time (sp3_a) is lower than the first reference voltage (VH) as the intermediate level (IL), the binary level may be determined to be 0.

As another example, referring to FIG. 3, in the sampling time (sp2_b), because the determined value of data before 1 UI is equal to 0, the binary level of the current data may be determined based on the second reference voltage (VL). Because the level of the receiving signal sampled in the sampling time (sp2_b) is higher than the second reference voltage (VL) as the intermediate level (IL), the binary level may be determined to be 1.

Next, referring to FIG. 3, in the sampling time (sp3_b), because the determined value of data before 1 UI is equal to 1, the binary level of the current data may be determined based on the first reference voltage (VH). Because the level of the receiving signal sampled in the sampling time (sp3_b) is higher than the first reference voltage (VH) as the highest level (HL), the binary level may be determined to be 1.

Next, referring to FIG. 3, in the sampling time (sp4_b), because the determined value of data before 1 UI is equal to 1, the binary level of the current data may be determined based on the first reference voltage (VH). Because the level of the receiving signal sampled in the sampling time (sp4_b) is lower than the first reference voltage (VH) as the intermediate level (IL), the binary level may be determined to be 0.

Figures 4, 5:
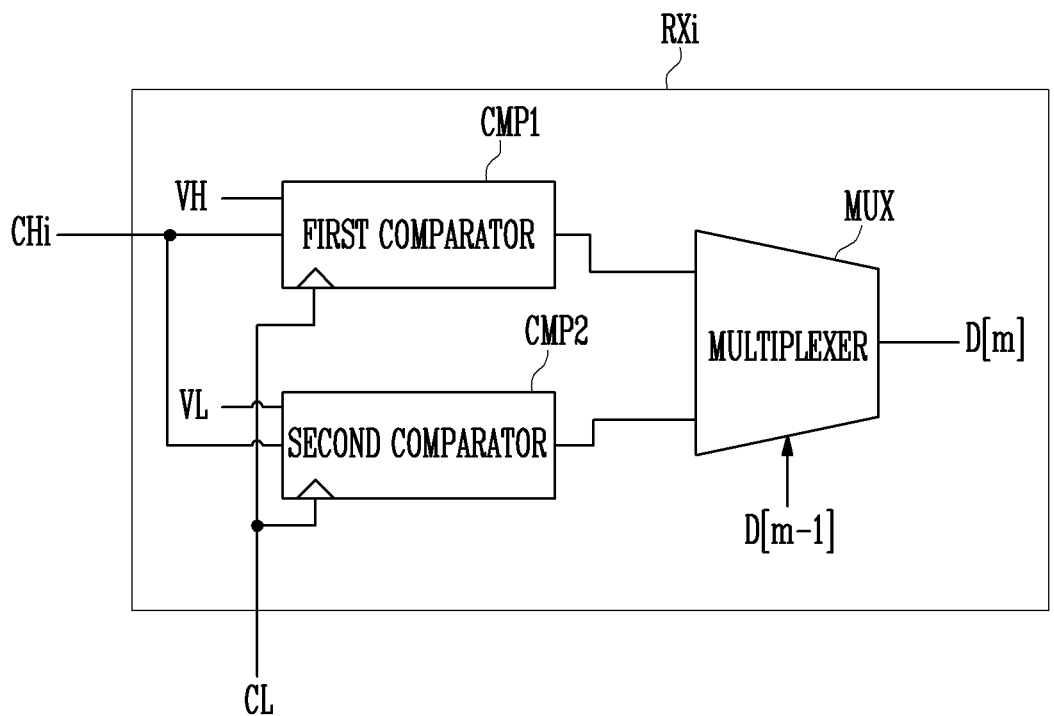
FIG. 4 is a view illustrating a receiving unit according to some example embodiments of the present disclosure.
FIG. 5 is a view illustrating a mode depending on a relationship between an adjacent receiving signal of an adjacent channel and a receiving signal of a target channel.

The above-mentioned disclosure is implemented according to some example embodiments as a receiving unit (RXi) illustrated, for example, in FIG. 4.

FIG. 4 is a view illustrating the receiving unit according to some example embodiments of the present disclosure.

Although the receiving unit (RXi) is illustrated in FIG. 4 based on an i-th channel (CHi), the same applies to another channel or receiving unit. i may be a natural number. If the i-th channel (CHi) is the sensing channel (CHn), the receiving unit (RXi) may be further connected with a sensing line (SL).

Referring to FIG. 4, the receiving unit (RXi) may include a first comparator (CMP1), a second comparator (CMP2), and a multiplexer (MUX).

The first comparator (CMP1) may compare the receiving signal with the first reference voltage (VH) in response to the sampling clock signal supplied through the common clock line (CL) to provide a logic value. The receiving signal may be received via the channel (CHi). The first comparator (CMP1) may be operated depending on a rising transition or a falling transition of the sampling clock signal and then sample the level of the receiving signal in that sampling time to compare it with the first reference voltage (VH). If the receiving signal is larger than the first reference voltage (VH), the first comparator (CMP1) may provide a high level of logic value. In contrast, if the receiving signal is smaller than the first reference voltage (VH), the first comparator may provide a low level of logic value.

The second comparator (CMP2) may compare the receiving signal with the second reference voltage (VL) in response to the sampling clock signal to provide a logic value. The receiving signal may be received via the channel (CHi). The second comparator (CMP2) may be operated depending on the rising transition or the falling transition of the sampling clock signal and then sample the level of the receiving signal in that sampling time to compare it with the second reference voltage (VL). If the receiving signal is larger than the second reference voltage (VL), the second comparator (CMP2) may provide a high level of logic value. In contrast, if the receiving signal is smaller than the second reference voltage (VL), the second comparator may provide a low level of logic value.

The multiplexer (MUX) may output one of output values of the first comparator (CMP1) and the second comparator (CMP2) as current data (D[m]). The multiplexer may select one of the output values of the first comparator (CMP1) and the second comparator (CMP2) based on past data (D[m−1]) before 1 UI and then output the selected output value as the current data (D[m]). For example, if the binary level of the past data (D[m−1]) is equal to 1, the output value of the first comparator (CMP1) may be outputted as the current data (D[m]). On the other hand, if the binary level of the past data (D[m−1]) is equal to 0, the output value of the second comparator (CMP2) may be outputted as the current data (D[m]). If the output value of the multiplexer (MUX) is the high level of logic value, the binary level of the current data (D[m]) may be equal to 1. If the output value of the multiplexer (MUX) is the low level of logic value, the binary level of the current data (D[m]) may be equal to 0.

FIG. 5 is a view illustrating a mode depending on a relationship between an adjacent receiving signal of an adjacent channel and a receiving signal of a target channel.

In the description of the crosstalk-induced jitter, the target channel is referred to as a victim, and the adjacent channel adversely affecting the victim is referred to as an aggressor. In the present description, the victim, namely, the target channel is assumed to be a channel (CH2), and the aggressor is assumed to be a channel (CH1).

Meanwhile, the crosstalk-induced jitter induced by the channel (CH2) may adversely affect the channel (CH1), and this adverse effect may again affect the channel (CH2). However, because this effect is relatively slight and leads to an excessively complicated description, a detailed description thereof will be omitted herein.

When the victim (CH2) is different in transition direction from the aggressor (CH1), this is referred to as an odd-mode. As illustrated in FIG. 5, there are two possible cases.

When the victim (CH2) has the same transition direction as the aggressor (CH1), this is referred to as an even-mode. As illustrated in FIG. 5, there are two possible cases.

On the other hand, when there is no transition in the aggressor (CH1) regardless of the transition direction of the victim (CH2), this is referred to as a static mode. As illustrated in FIG. 5, there are two possible cases.

FIG. 6 is a view illustrating a crosstalk-induced jitter generated by the adjacent receiving signal, and FIG. 7 is a view illustrating another example of a crosstalk-induced jitter generated by the adjacent receiving signal.

Referring to FIG. 6, the even-mode where both the victim (CH2) and the aggressor (CH1) is subjected to the rising transition is illustrated.

If the rising transition occurs in the aggressor (CH1), a voltage drop occurs in an opposite direction, namely, downwards in the victim (CH2), due to mutual-inductance between the two channels (CH1, CH2).

Therefore, a certain period of time is further required for the voltage of the victim (CH2) to rise again. The delay caused as such becomes the crosstalk-induced jitter in the even mode.

Referring to FIG. 7, the even mode where both the victim (CH2) and the aggressor (CH1) are subjected to the falling transition is illustrated.

If the falling transition occurs in the aggressor (CH1), a voltage rise occurs in an opposite direction, namely, upwards in the victim (CH2), due to the mutual-inductance between the two channels (CH1, CH2).

Therefore, a certain period of time is further required for the voltage of the victim (CH2) to fall again. The delay caused as such becomes the crosstalk-induced jitter in the even mode.

Consequently, in the even-mode, the crosstalk-induced jitter wherein the receiving signal of the victim (CH2) is delayed regardless of the transition direction is generated.

The odd mode may cause the crosstalk-induced jitter in an opposite direction to the even mode, and a description thereof will be omitted herein. For reference, the crosstalk-induced jitter may not occur in the static mode.

Figure 8:
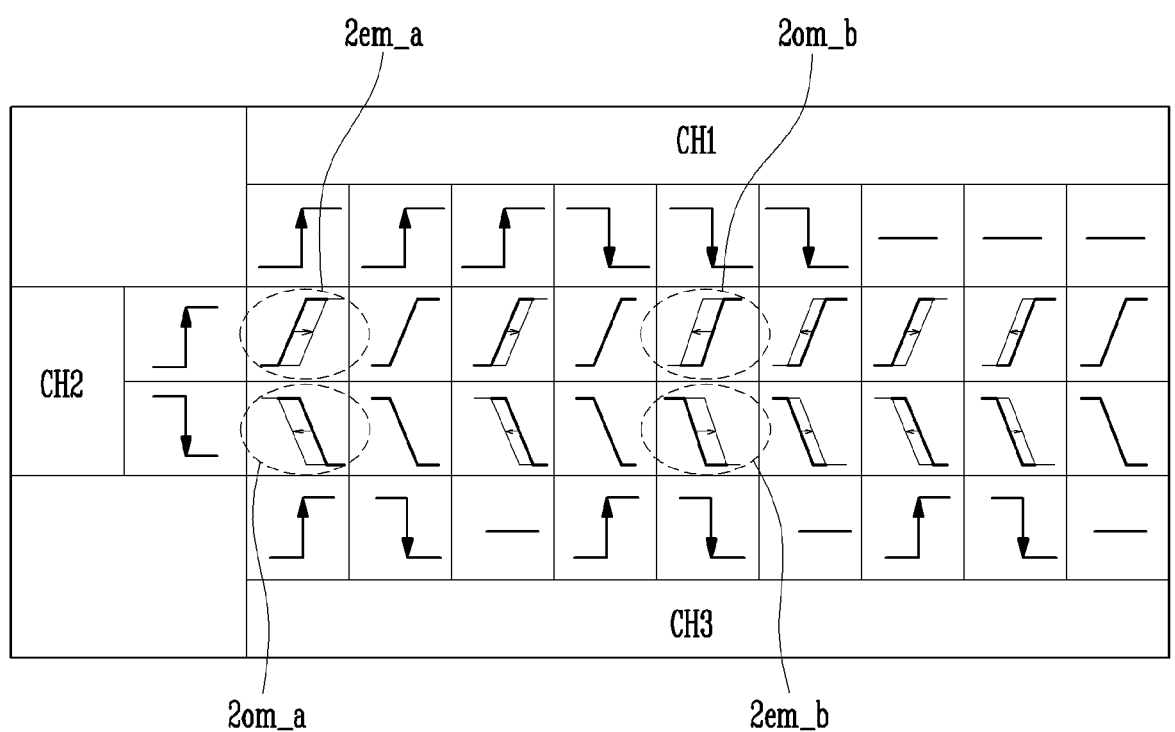
FIG. 8 is a view illustrating a crosstalk-induced jitter caused by a relationship between adjacent receiving signals of two adjacent channels and a receiving signal of a target channel.

FIG. 8 is a view illustrating a crosstalk-induced jitter caused by a relationship between adjacent receiving signals of two adjacent channels and a receiving signal of a target channel.

In the present description, the victim, namely, the target channel is assumed to be a channel (CH2), and the aggressor is assumed to be channels (CH1, CH3).

Meanwhile, the crosstalk-induced jitter induced by the channel (CH2) may adversely affect the channels (CH1, CH3), and this adverse effect may again affect the channel (CH2). However, because this effect is relatively slight and leads to an excessively complicated description, some description thereof will be omitted herein.

Figure 9:
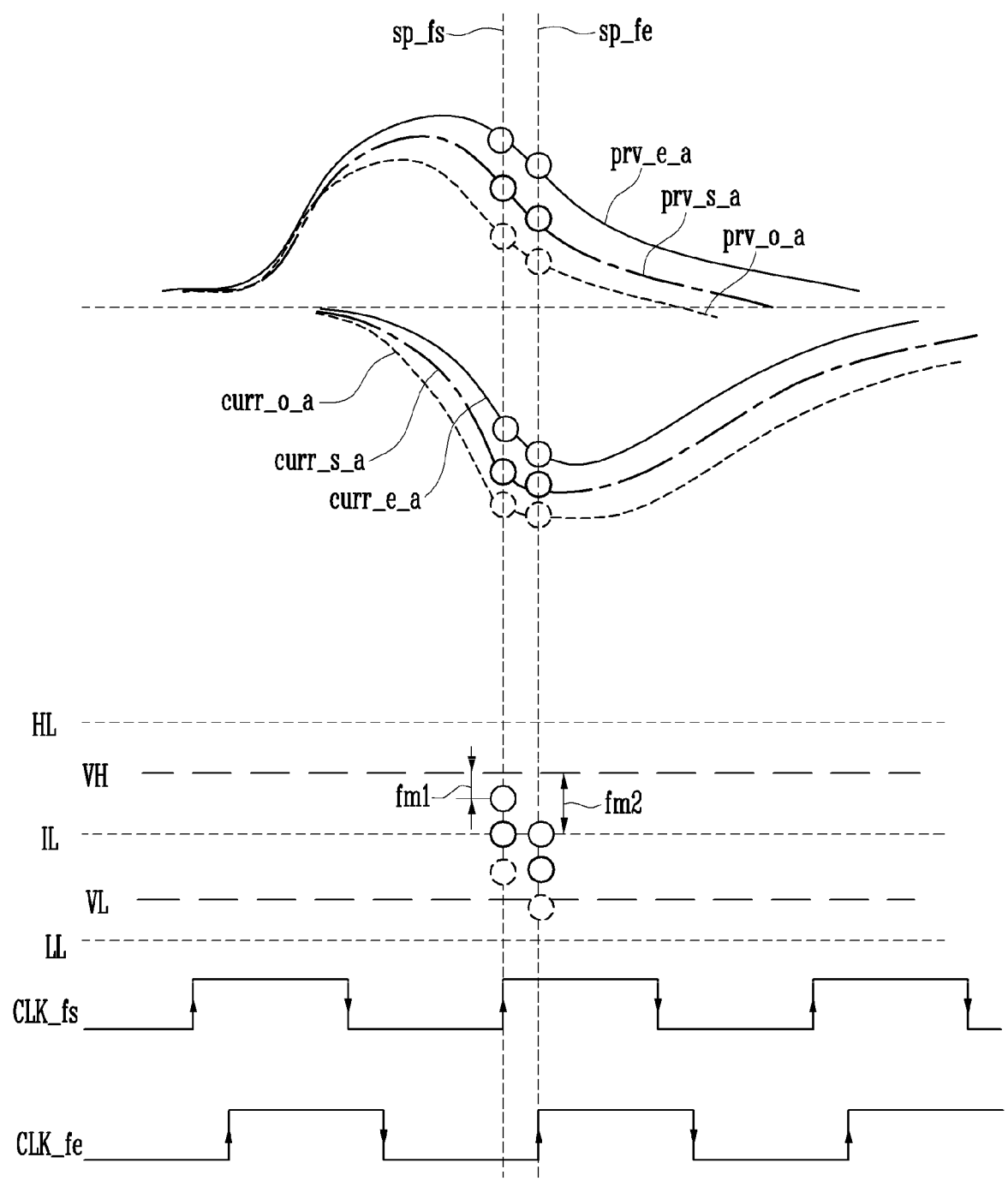
FIG. 9 is a view illustrating a reason why first training pattern signals having the same first transition direction are received through channels in a training mode.

When the victim (CH2) has the same transition direction as the two adjacent aggressors (CH1, CH3), this is referred to as a 2-even mode. As illustrated in FIG. 9, there are two possible cases in which all signals of the channels (CH1, CH2, CH3) have the rising transition (2em_a), and all signals of the channels (CH1, CH2, CH3) have the falling transition (2em_b).

Referring to FIG. 8, when transitions occur in the same direction in the two aggressors (CH1, CH3), the largest crosstalk-induced jitter is generated. When transition occurs in only one aggressor, the smaller crosstalk-induced jitter is generated. When transitions occur in opposing directions in the two aggressors (CH1, CH3), they are offset and thereby the crosstalk-induced jitter is not generated.

When the transition directions of the two adjacent aggressors (CH1, CH3) are equal to each other but are opposite to the transition direction of the victim (CH2), this is referred to as a 2-odd mode. Two cases (2om_a, 2om_b) are illustrated in FIG. 9. In this case, the direction of the crosstalk-induced jitter is opposite to that of the 2-even mode.

When no transition occurs in the two adjacent aggressors (CH1, CH3), this becomes the static mode.

FIG. 9 is a view illustrating a reason why first training pattern signals having the same first transition direction are received through channels in a training mode.

Hereinafter, the first transition direction may mean a falling transition direction. Further, the second transition direction may mean a rising transition direction.

Turning back to FIGS. 2 and 3, it is possible to understand the following features of the duo-binary signaling. In both the rising transition where the binary level is subjected to transition from 0 to 1, and the falling transition where the binary level is subjected to transition from 1 to 0, the level of the sampled receiving signal becomes the intermediate level (IL).

For example, referring to the transmitting signal of FIG. 2, the binary level is subjected to the rising transition from 0 to 1, and immediately is subjected to the falling transition from 1 to 0. Referring to the receiving signal (fr_a) of FIG. 2, both the levels of the receiving signals sampled at the sampling times (sp2_a, sp3_a) corresponding to respective transitions are the intermediate level (IL).

Further, for example, referring to the transmitting signal of FIG. 3, the binary level is subjected to the rising transition from 0 to 1, is maintained to be 1 during 1 UI, and then is subjected to the falling transition from 1 to 0. At this time, referring to the receiving signal (spr_b) of FIG. 3, both the levels of the receiving signals sampled at the sampling times (sp2_b, sp4_b) corresponding to respective transitions are the intermediate level (IL).

According to some example embodiments, it is possible to compensate for the crosstalk-induced jitter based on the features of the duo-binary signaling.

Turning back to FIG. 9, a case where the binary level of the signal before 1 UI is 1 and the binary level of the current signal is 0 is conceptually illustrated. That is, this is the falling transition. FIG. 9 does not illustrate an actual signal, but illustrates the response to each binary data that is conceptually separated and exaggerated, for the sake of easy understanding. For example, the sampling time (sp_fs) of FIG. 9 may correspond to the sampling time (sp3_a) of FIG. 2, and a signal obtained by overlapping the previous signal (prv_s_a) with the current signal (curr_s_a) of FIG. 9 may be a receiving signal (fr_a) at the sampling time (sp3_a) of FIG. 2.

Previous signals (prv_o_a, prv_s_a, prv_e_a) of FIG. 9 are a single bit response to the binary level of 1 in the odd mode, the static mode, and the even mode, respectively. To clearly illustrate the signal, it is assumed that the level of previous and post binary data is 0.

Current signals (curr_o_a, curr_s_a, curr_e_a) of FIG. 9 are a single bit response to the binary level of 0 in the odd mode, the static mode, and the even mode, respectively. To clearly illustrate the signal, it is assumed that the level of previous and post binary data is 1.

The sampling time (sp_fs) is a time for sampling a phase-adjusted sampling clock signal (CLK_fs) based on the static mode, and the sampling time (sp_fe) is a time for sampling a phase-adjusted sampling clock signal (CLK_fe) based on the even mode.

When the receiving signals are in the static mode and are sampled at the sampling time (sp_fs) using the sampling clock signal (CLK_fs), the sum of a first post-cursor of the signal (prv_s_a) before 1 UI and a main-cursor of the current signal (curr_s_a) becomes the intermediate level (IL). Because the binary level of the previous signal (prv_s_a) is 1, the first reference voltage (VH) is used to determine the current signal (curr_s_a). Because the sum of the first post-cursor of the signal (prv_s_a) before 1 UI and the main-cursor of the current signal (curr_s_a) is the intermediate level (IL) and is lower than the first reference voltage (VH), the binary level of the current signal (curr_s_a) may be determined to be 0.

Meanwhile, when the receiving signals are in the even mode and are sampled at the sampling time (sp_s) using the sampling clock signal (CLK_fs), the sum of a first post-cursor of the signal (prv_e_a) before 1 UI and a main-cursor of the current signal (curr_e_a) is higher than the intermediate level (IL). Because the binary level of the previous signal (prv_e_a) is 1, the first reference voltage (VH) is used to determine the current signal (curr_e_a). Because the sum of the first post-cursor of the signal (prv_e_a) before 1 UI and the main-cursor of the current signal (curr_e_a) is lower than the first reference voltage (VH), the binary level of the current signal (curr_s_a) should be determined to be 0, which is problematic in that a margin (fm1) is too small. If the sum of the first post-cursor of the signal (prv_e_a) before 1 UI and the main-cursor of the current signal (curr_e_a) is more than the first reference voltage (VH) depending on communication environment, an error occurs in decoding.

When the receiving signals are in the odd mode and are sampled at the sampling time (sp_fs) using the sampling clock signal (CLK_fs), the sum of a first post-cursor of the signal (prv_o_a) before 1 UI and a main-cursor of the current signal (curr_o_a) is lower than the intermediate level (IL). Because the binary level of the previous signal (prv_o_a) is 1, the first reference voltage (VH) is used to determine the current signal (curr_o_a). Because the sum of the first post-cursor of the signal (prv_o_a) before 1 UI and the main-cursor of the current signal (curr_o_a) is sufficiently lower than the first reference voltage (VH), the binary level of the current signal (curr_o_a) may be easily determined to be 0. In this case, a larger margin is guaranteed as compared to the static mode.

As described above, in the falling transition, the worst case where compensation should be performed is the even mode.

According to some example embodiments, it is possible to receive "the first training pattern signals having the same first transition direction", namely, "the first training pattern signals having the falling transition direction of the even mode" through the channels (CH1-CH(2n−)) in the training mode.

According to the present embodiment, the phase-adjusted sampling clock signal (CLK_fe) may be generated so that the transition time of the first training pattern signal corresponds to the sampling time (sp_fe). It can be seen that a sufficient margin (fm2) is obtained in the case of the even mode at the phase-adjusted sampling time (sp_fe). Because the static mode and the odd mode have a larger margin, they have no problem. Thus, in the case of using the sampling clock signal (CLK_fe), the decoding error caused by the crosstalk-induced jitter is reduced in all modes.

Figure 10:
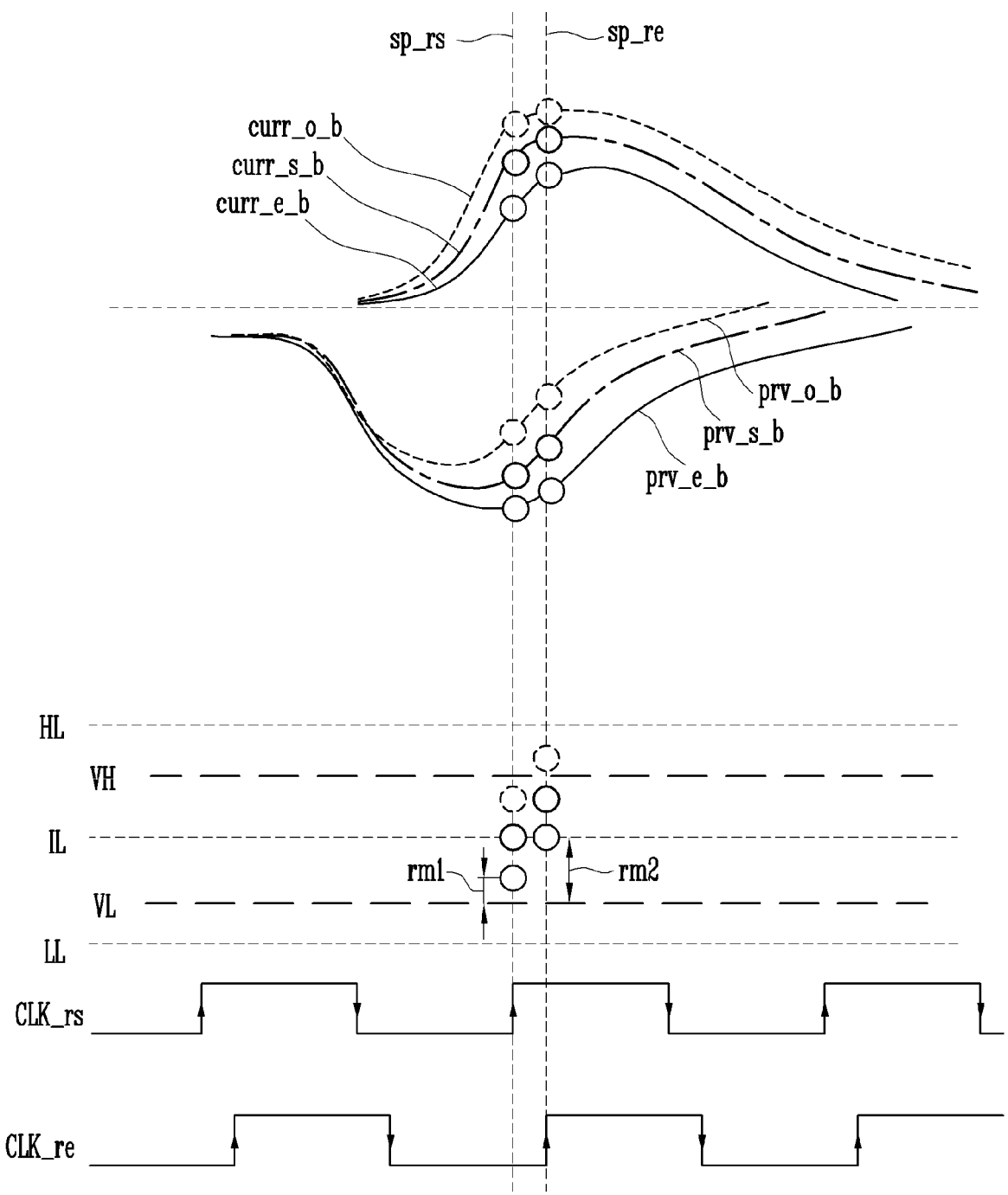
FIG. 10 is a view illustrating a reason why second training pattern signals having the same second transition direction are received through channels in a training mode.

FIG. 10 is a view illustrating a reason why second training pattern signals having the same second transition direction are received through channels in a training mode.

Referring to FIG. 10, a case where the binary level of the signal before 1 UI is 0 and the binary level of the current signal is 1 is conceptually illustrated. That is, this is the rising transition. FIG. 10 does not illustrate an actual signal, but illustrates the response to each binary data that is conceptually separated and exaggerated, for the sake of easy understanding. For example, the sampling time (sp_rs) of FIG. 10 may correspond to the sampling time (sp2_a) of FIG. 2, and a signal obtained by overlapping the previous signal (prv_s_b) with the current signal (curr_s_b) of FIG. 10 may be a receiving signal (fr_a) at the sampling time (sp2_a) of FIG. 2.

Previous signals (prv_o_b, prv_s_b, prv_e_b) of FIG. 10 are a single bit response to the binary level of 0 in the odd mode, the static mode, and the even mode, respectively. To clearly illustrate the signal, it is assumed that the level of previous and post binary data is 1.

Current signals (curr_o_b, curr_s_b, curr_e_b) of FIG. 10 are a single bit response to the binary level of 1 in the odd mode, the static mode, and the even mode, respectively. To clearly illustrate the signal, it is assumed that the level of previous and post binary data is 0.

The sampling time (sp_rs) is a time for sampling a phase-adjusted sampling clock signal (CLK_rs) based on the static mode, and the sampling time (sp_re) is a time for sampling a phase-adjusted sampling clock signal (CLK_re) based on the even mode.

When the receiving signals are in the static mode and are sampled at the sampling time (sp_rs) using the sampling clock signal (CLK_rs), the sum of a first post-cursor of the signal (prv_s_b) before 1 UI and a main-cursor of the current signal (curr_s_b) becomes the intermediate level (IL). Because the binary level of the previous signal (prv_s_b) is 0, the second reference voltage (VL) is used to determine the current signal (curr_s_b). Because the sum of the first post-cursor of the signal (prv_s_b) before 1 UI and the main-cursor of the current signal (curr_s_b) is the intermediate level (IL) and is higher than the second reference voltage (VL), the binary level of the current signal (curr_s_b) may be determined to be 1.

Meanwhile, when the receiving signals are in the even mode and are sampled at the sampling time (sp_rs) using the sampling clock signal (CLK_rs), the sum of a first post-cursor of the signal (prv_e_b) before 1 UI and a main-cursor of the current signal (curr_e_b) is lower than the intermediate level (IL). Because the binary level of the previous signal (prv_e_b) is 0, the second reference voltage (VL) is used to determine the current signal (curr_b_a). Because the sum of the first post-cursor of the signal (prv_e_b) before 1 UI and the main-cursor of the current signal (curr_e_b) is higher than the second reference voltage (VL), the binary level of the current signal (curr_s_b) should be determined to be 1, which is problematic in that a margin (rm1) is too small. If the sum of the first post-cursor of the signal (prv_e_b) before 1 UI and the main-cursor of the current signal (curr_e_b) is less than the second reference voltage (VL) depending on communication environment, an error occurs in decoding.

When the receiving signals are in the odd mode and are sampled at the sampling time (sp_rs) using the sampling clock signal (CLK_rs), the sum of a first post-cursor of the signal (prv_o_b) before 1 UI and a main-cursor of the current signal (curr_o_b) is higher than the intermediate level (IL). Because the binary level of the previous signal (prv_o_b) is 0, the second reference voltage (VL) is used to determine the current signal (curr_o_b). Because the sum of the first post-cursor of the signal (prv_o_b) before 1 UI and the main-cursor of the current signal (curr_o_b) is sufficiently higher than the second reference voltage (VL), the binary level of the current signal (curr_o_b) may be easily determined to be 1. In this case, a larger margin is guaranteed as compared to the static mode.

As described above, likewise in the rising transition, the worst case where compensation should be performed is the even mode.

According to some example embodiments, it is possible to receive "the second training pattern signals having the same second transition direction", namely, "the second training pattern signals having the rising transition direction of the even mode" through the channels (CH1-CH(2n−1)) in the training mode.

According to some example embodiments, the phase-adjusted sampling clock signal (CLK_re) may be generated so that the transition time of the second training pattern signal corresponds to the sampling time (sp_re). It can be seen that a sufficient margin (rm2) is obtained in the case of the even mode at the phase-adjusted sampling time (sp_re). Because the static mode and the odd mode have a larger margin, they have no problem. Thus, in the case of using the sampling clock signal (CLK_re), the decoding error caused by the crosstalk-induced jitter is reduced in all modes.

In both the falling transition of FIG. 9 and the rising transition of FIG. 10, the phase of the sampling clock signals (CLK_fe, CLK_re) set based on the even mode is more delayed than the phase of the sampling clock signals (CLK_fs, CLK_rs) set based on the static mode.

Thus, according to some example embodiments of the present disclosure, if only any one of the first training pattern signal and the second training pattern signal is trained in the training mode, margins (fm2, rm2) may be obtained.

According to some example embodiments of the present disclosure, both the first training pattern signal and the second training pattern signal may be trained in the training mode. In this case, the clock data recovery unit (CDR) may generate a sampling clock signal to correspond to a more delayed phase among the first sampling time (sp_fe) corresponding to the first transition time of the first training pattern signal and the second sampling time (sp_re) corresponding to the second transition time of the second training pattern signal. In this case, because the transition corresponding to a faster phase obtains an additional margin from the corresponding reference voltage, it is possible to solve the decoding error without any difficulty.

Although it is illustrated in FIGS. 9 and 10 that sampling is performed depending on the rising transition of the sampling clock signal, any product may adopt sampling depending on the falling transition of the sampling clock signal. Further, when a current integral type of sampling is applied to a product, the transition time of the clock signal (CLK_fs, CLK_fe, CLK_rs, CLK_re) may precede the sampling time (sp_fs, sp_fe, sp_rs, sp_re) so as to obtain an acquisition time.

Figure 11:
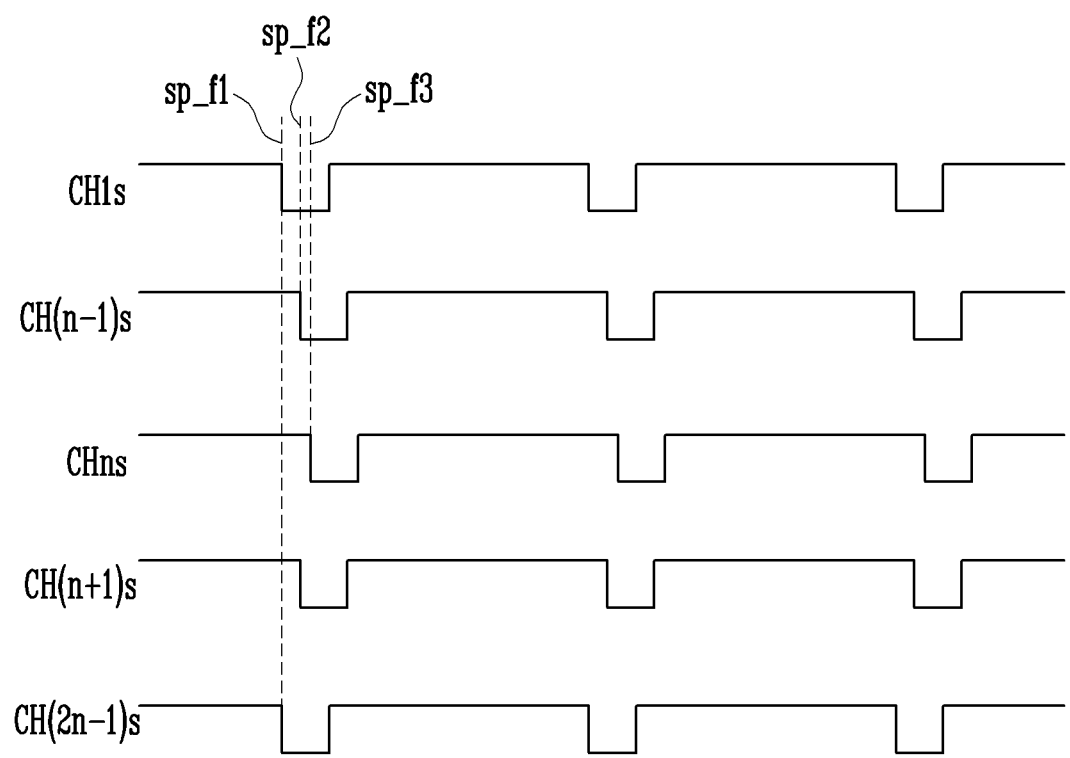
FIGS. 11 and 12 are views illustrating a reason why a clock signal is recovered using a first training pattern signal of a sensing channel in the first training pattern signals of the channels.
Figure 12:
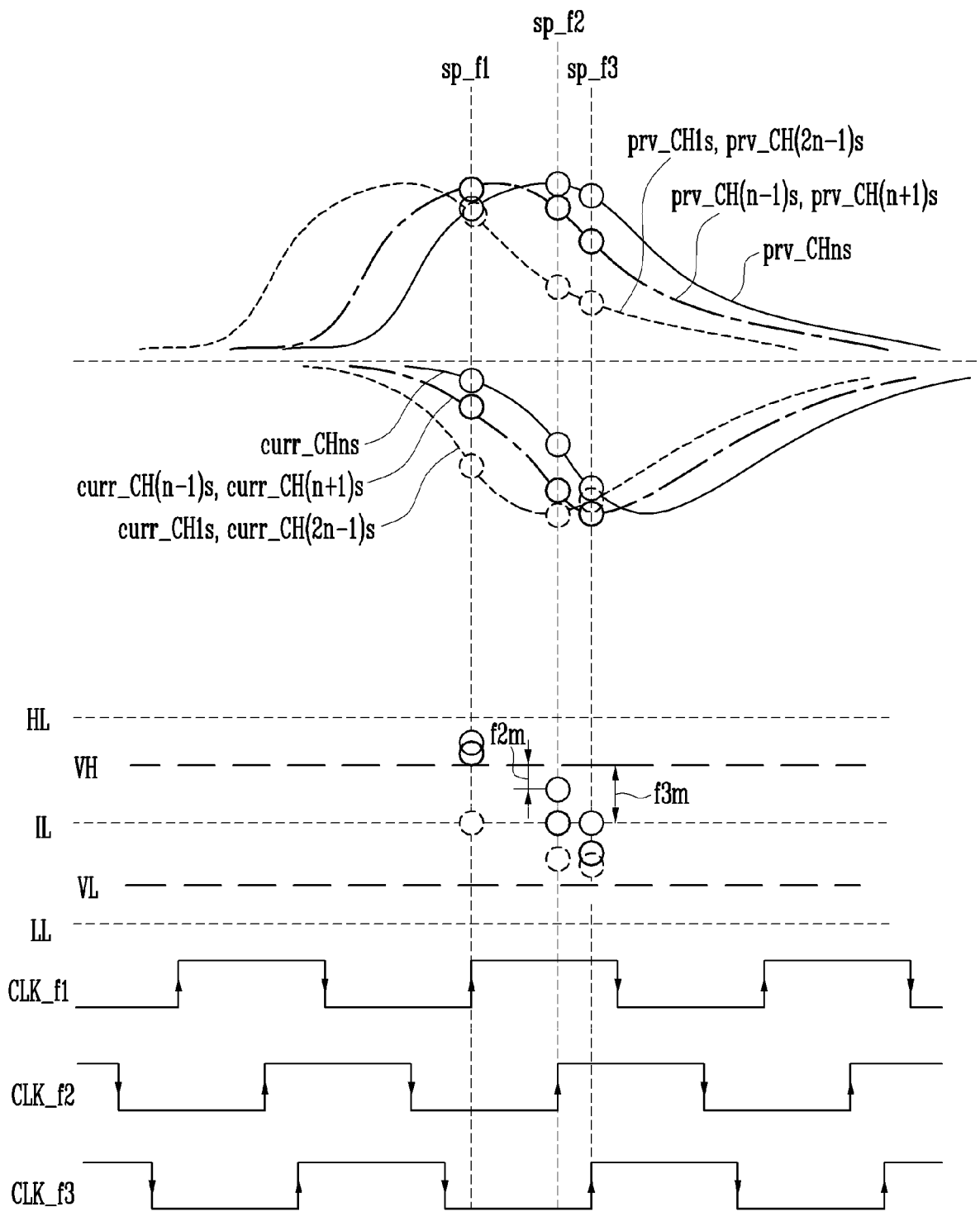

FIGS. 11 and 12 are views illustrating a reason why a clock signal is recovered using a first training pattern signal of a sensing channel in the first training pattern signals of the channels.

Hereinafter, it is assumed that the training pattern signals are provided in the even mode.

Even though the transmitting units (TX1-TX(2n−1)) transmit the same first training pattern signals, the sensing channel (CHn) located at a middle position is most affected by the crosstalk-induced jitter, so that the phase of the first training pattern signal (CHns) may be most delayed. The sampling clock signal (CLK_f3) may be a phase-adjusted signal so that the transition time of the first training pattern signal (CHns) corresponds to the sampling time (sp_f3).

The phase of the first training pattern signals (CH(n−1)s, CH(n+1)s) received through the channels (CH(n−1), CH(n+1)) is more delayed than the phase of other first training pattern signals, but may be faster than the phase of the first training pattern signal (CHns). The sampling clock signal (CLK_f2) may be a phase-adjusted signal so that the transition time of the first training pattern signals (CH(n−1)s, CH(n+1)s) correspond to the sampling time (sp_f2).

Because the channels (CH1, CH(2n−1)) located at the outermost position are least affected by the crosstalk-induced jitter, the phase of the first training pattern signals (CH1s, CH(2n−1)s) received through the channels (CH1, CH(2n−1)) may be faster than the phase of other first training pattern signals. The sampling clock signal (CLK_f1) may be a phase-adjusted signal so that the transition time of the first training pattern signals (CH1s, CH(2n−1)s) corresponds to the sampling time (sp_f1).

When the sampling is performed at the sampling time (sp_f1) using the sampling clock signal (CLK_f1), the sum of the first post-cursors of the previous signals (prv_CH1s, prv_CH(2n−1)s) of the channels (CH1, CH(2n−1)) and the main-cursors of the current signals (curr_CH1s, curr_CH(2n−1)s) becomes the intermediate level (IL), and the first reference voltage (VH) and the margin are sufficient. Thus, there is no problem in decoding the binary level to 0.

However, because the sum of the first post-cursors of the previous signals (prv_CH(n−1)s, prv_CH(n+1)s) of the channels (CH(n−1), CH(n+1)) and the main-cursors of the current signals (curr_CH(n−1)s, curr_CH(n+1)s) and the sum of the first post-cursor of the previous signal (prv_CHns) of the channel (CHn) and the main-cursor of the current signal (curr_CHns) are more than the first reference voltage (VH), the binary level is erroneously decoded to 1, thus causing an error.

When the sampling is performed at the sampling time (sp_f2) using the sampling clock signal (CLK_f2), the sum of the first post-cursors of the previous signals (prv_CH(n−1)s, prv_CH(n+1)s) of the channels (CH(n−1), CH(n+1)) and the main-cursors of the current signals (curr_CH(n−1)s, curr_CH(n+1)s) becomes the intermediate level (IL), and the first reference voltage (VH) and the margin are sufficient. Thus, there is no problem in decoding the binary level to 0.

Further, because the sum of the first post-cursors of the previous signals (prv_CH1s, prv_CH(2n−1)s) of the channels (CH1, CH(2n−1)) and the main-cursors of the current signals (curr_CH1s, curr_CH(2n−1)s) becomes equal to or less than the intermediate level (IL), the first reference voltage (VH) and the margin are sufficient. Thus, there is no problem in decoding the binary level to 0.

However, the sum of the first post-cursor of the previous signal (prv_CHns) of the channel (CHn) and the main-cursor of the current signal (curr_CHns) lacks in margin (f2m) with the first reference voltage (VH), so that there is possibility of erroneously decoding the binary level to 1.

When the sampling is performed at the sampling time (sp_f3) using the sampling clock signal (CLK_f3), the sum of the first post-cursor of the previous signal (prv_CHns) of the channel (CHn) and the main-cursor of the current signal (curr_CHns) becomes the intermediate level (IL), and the margin (f3m) with the first reference voltage (VH) is sufficient. Thus, there is no problem in decoding the binary level to 0. Because other channels (CH1, CH(n−1), CH(n+1), CH(2n−1)) have a larger margin with the first reference voltage (VH), there is no problem in decoding the binary level to 0.

Thus, even if the sampling clock signal (CLK_f3) is generated using the first training pattern signal of the sensing channel (CHn) on which the crosstalk-induced jitter most strongly acts, it can be seen that there is no problem in precisely sampling the data signals of other channels (CH1, CH(n−1), CH(n+1), CH(2n−1)).

Figure 13:
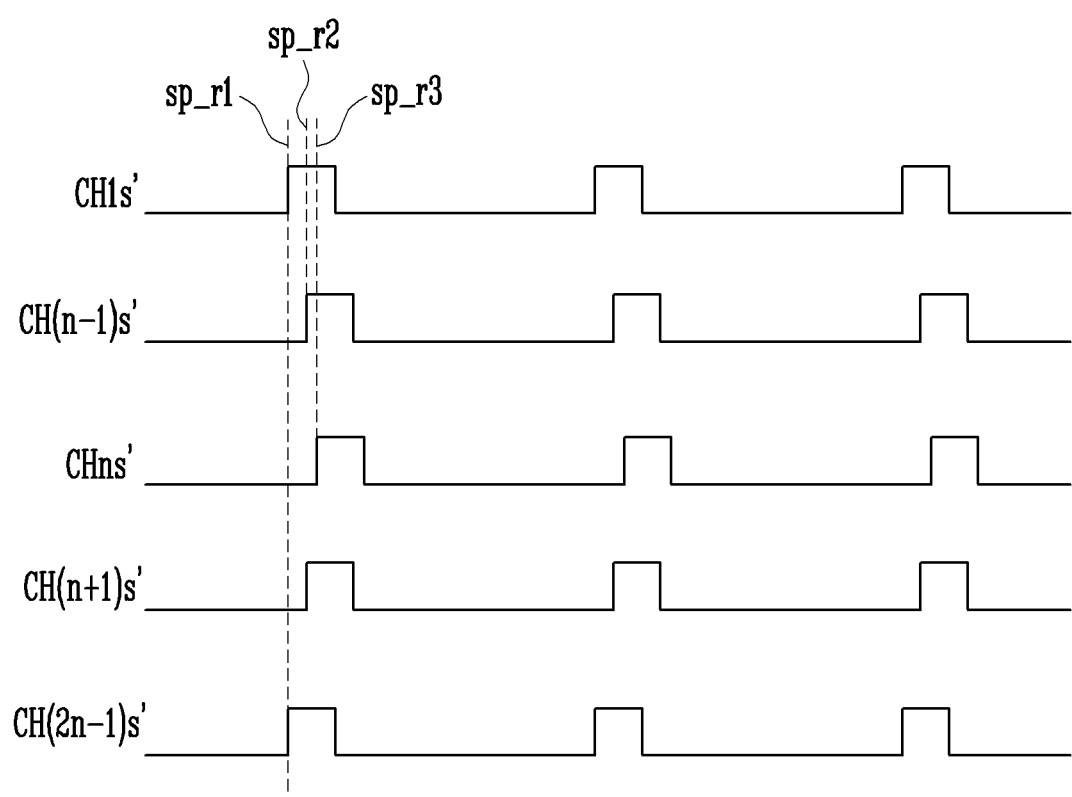
FIGS. 13 and 14 are views illustrating a reason why a clock signal is recovered using a second training pattern signal of a sensing channel in the second training pattern signals of the channels.
Figure 14:
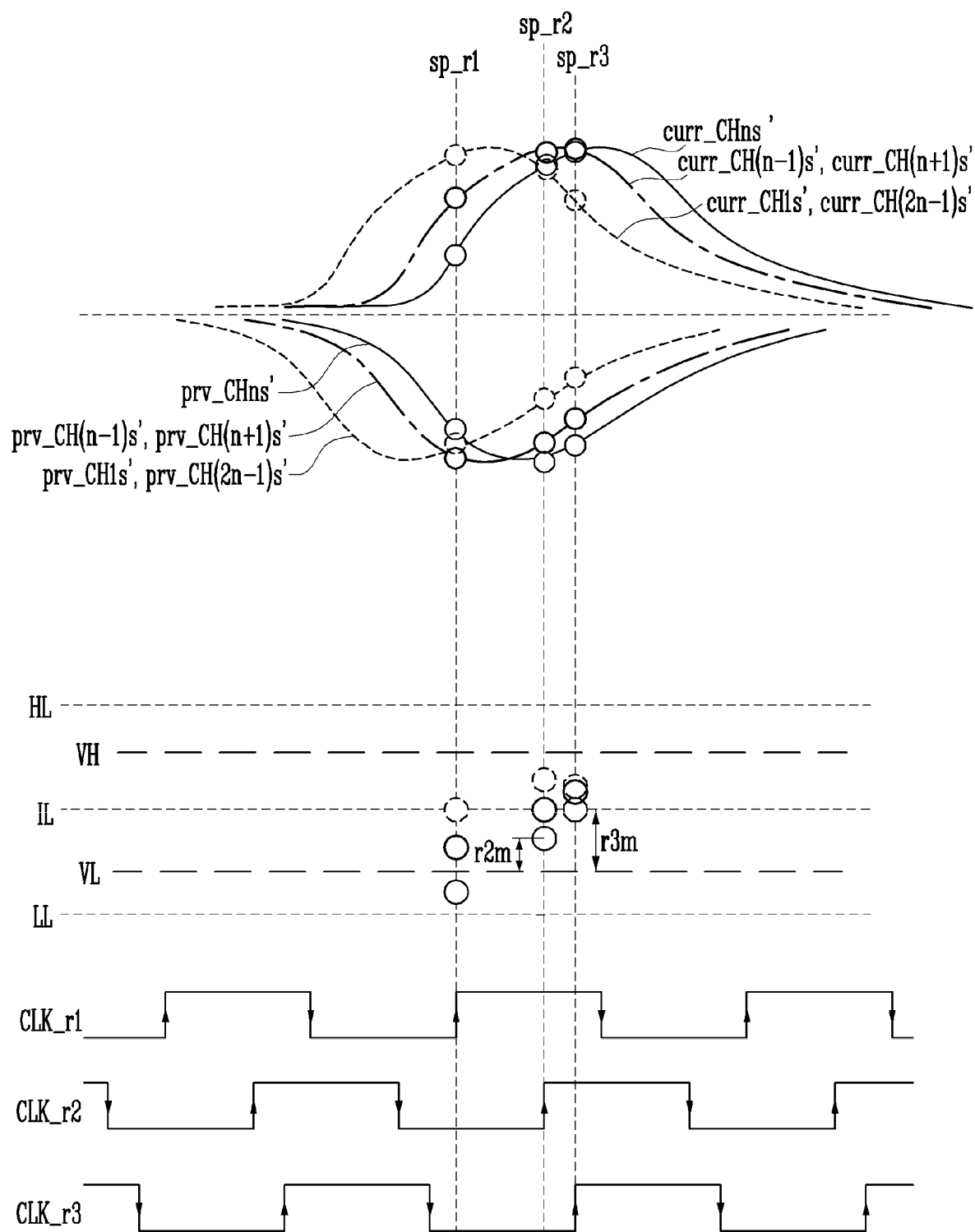

FIGS. 13 and 14 are views illustrating a reason why a clock signal is recovered using a second training pattern signal of a sensing channel in the second training pattern signals of the channels.

Hereinafter, it is assumed that the training pattern signals are provided in the even mode.

Even though the transmitting units (TX1-TX(2n−1)) transmit the same second training pattern signals, the sensing channel (CHn) located at a middle position is most affected by the crosstalk-induced jitter, so that the phase of the second training pattern signal (CHns') may be most delayed. The sampling clock signal (CLK_r3) may be a phase-adjusted signal so that the transition time of the second training pattern signal (CHns') corresponds to the sampling time (sp_r3).

The phase of the second training pattern signals (CH(n−1)s', CH(n+1)s') received through the channels (CH(n−1), CH(n+1)) is more delayed than the phase of other second training pattern signals, but may be faster than the phase of the second training pattern signal (CHns'). The sampling clock signal (CLK_r2) may be a phase-adjusted signal so that the transition time of the second training pattern signals (CH(n−1)s', CH(n+1)s') correspond to the sampling time (sp_r2).

Because the channels (CH1, CH(2n−1)) located at the outermost position are least affected by the crosstalk-induced jitter, the phase of the second training pattern signals (CH1s', CH(2n−1)s') received through the channels (CH1, CH(2n−1)) may be faster than the phase of other second training pattern signals. The sampling clock signal (CLK_r1) may be a phase-adjusted signal so that the transition time of the second training pattern signals (CH1s', CH(2n−1)s') corresponds to the sampling time (sp_r1).

When the sampling is performed at the sampling time (sp_r1) using the sampling clock signal (CLK_r1), the sum of the first post-cursors of the previous signals (prv_CH1s', prv_CH(2n−1)s') of the channels (CH1, CH(2n−1)) and the main-cursors of the current signals (curr_CH1s', curr_CH(2n−1)s') becomes the intermediate level (IL), and the second reference voltage (VL) and the margin are sufficient. Thus, there is no problem in decoding the binary level to 0.

However, because the sum of the first post-cursors of the previous signals (prv_CH(n−1)s', prv_CH(n+1)s') of the channels (CH(n−1), CH(n+1)) and the main-cursors of the current signals (curr_CH(n−1)s', curr_CH(n+1)s') lacks in margin, the binary level may be erroneously decoded to 0. Further, because the sum of the first post cursor of the previous signal (prv_CHns') of the channel (CHn) and the main cursor of the current signal (curr_CHns') is less than the second reference voltage (VL), the binary level is erroneously decoded to 0, thus causing an error.

When the sampling is performed at the sampling time (sp_r2) using the sampling clock signal (CLK_r2), the sum of the first post-cursors of the previous signals (prv_CH(n−1)s', prv_CH(n+1)s') of the channels (CH(n−1), CH(n+1)) and the main-cursors of the current signals (curr_CH(n−1)s', curr_CH(n+1)s') becomes the intermediate level (IL), and the second reference voltage (VL) and the margin are sufficient. Thus, there is no problem in decoding the binary level to 1.

Further, because the sum of the first post-cursors of the previous signals (prv_CH1s', prv_CH(2n−1)s') of the channels (CH1, CH(2n−1)) and the main-cursors of the current signals (curr_CH1s', curr_CH(2n−1)s') becomes equal to or more than the intermediate level (IL), the second reference voltage (VL) and the margin are sufficient.

Thus, there is no problem in decoding the binary level to 1.

However, the sum of the first post-cursor of the previous signal (prv_CHns') of the channel (CHn) and the main-cursor of the current signal (curr_CHns') lacks in margin (r2m) with the second reference voltage (VL), so that there is possibility of erroneously decoding the binary level to 0.

When the sampling is performed at the sampling time (sp_r3) using the sampling clock signal (CLK_r3), the sum of the first post-cursor of the previous signal (prv_CHns') of the channel (CHn) and the main-cursor of the current signal (curr_CHns') becomes the intermediate level (IL), and the margin (r3m) with the second reference voltage (VL) is sufficient. Thus, there is no problem in decoding the binary level to 1. Because other channels (CH1, CH(n−1), CH(n+1), CH(2n−1)) have a larger margin with the second reference voltage (VL), there is no problem in decoding the binary level to 1.

Thus, even if the sampling clock signal (CLK_f3) is generated using the second training pattern signal of the sensing channel (CHn) on which the crosstalk-induced jitter most strongly acts, it can be seen that there is no problem in precisely sampling the data signals of other channels (CH1, CH(n−1), CH(n+1), CH(2n−1)).

Figure 15:
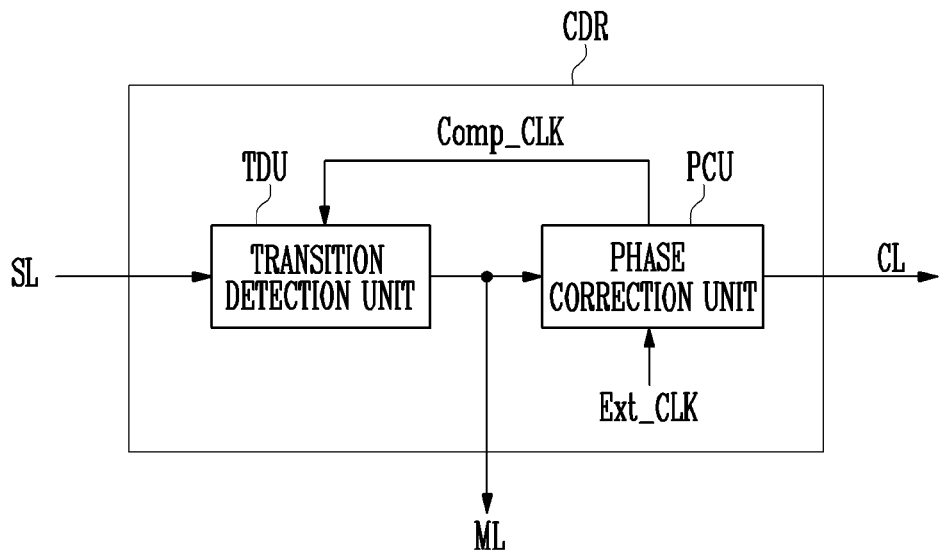
FIG. 15 is a view illustrating a clock data recovery unit according to some example embodiments of the present disclosure.

FIG. 15 is a view illustrating a clock data recovery unit according to some example embodiments of the present disclosure.

Referring to FIG. 15, the clock data recovery unit (CDR) may include a transition detection unit (or transition detection circuit) (TDU) and a phase correction unit (or phase correction circuit) (PCU).

The transition detection unit (TDU) may provide a mode signal corresponding to a training mode or a normal mode based on the training pattern signal and the compensated clock signal (Comp_CLK). The training pattern signal may be a first training pattern signal or a second training pattern signal, and may be received through a sensing line (SL). The mode signal may be provided through a common mode line (ML).

The phase correction unit (PCU) may generate at least one of the compensated clock signal (Comp_CLK) and the sampling clock signal based on a mode signal and an external clock signal (Ext_CLK). The compensated clock signal (Comp_CLK) may be provided to the transition detection unit (TDU), and the sampling clock signal may be provided to the common clock line (CL).

First, the transition detection unit (TDU) may provide a mode signal corresponding to the training mode when the training pattern signal is inputted, and the phase correction unit (PCU) may correct the phase of the external clock signal (Ext_CLK) to generate the compensated clock signal (Comp_CLK) when the mode signal corresponding to the training mode.

Next, the transition detection unit (TDU) may provide a mode signal corresponding to the normal mode in the case of succeeding in detecting the transition time of the training pattern signal based on the compensated clock signal (Comp_CLK) in the training mode. On the other hand, the transition detection unit (TDU) may provide the mode signal corresponding to the training mode in the case of failing in detecting the transition time of the training pattern signal based on the compensated clock signal (Comp_CLK) in the training mode.

When the training mode is maintained, the phase correction unit (PCU) may re-correct the phase of the external clock signal (Ext_CLK) to generate the compensated clock signal (Comp_CLK). Further, when the training mode is completed and the normal mode is started, the phase correction unit (PCU) may generate the sampling clock signal having the same phase as the current compensated clock signal (Comp_CLK).

Figure 16:
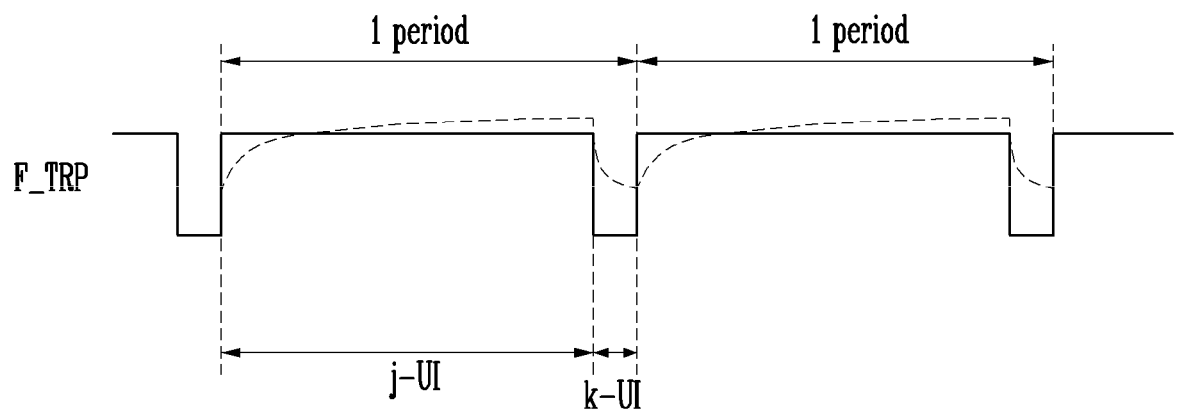
FIG. 16 is a view illustrating the more effective elimination of inter-symbol interference when using an example first training pattern signal.
Figure 17:
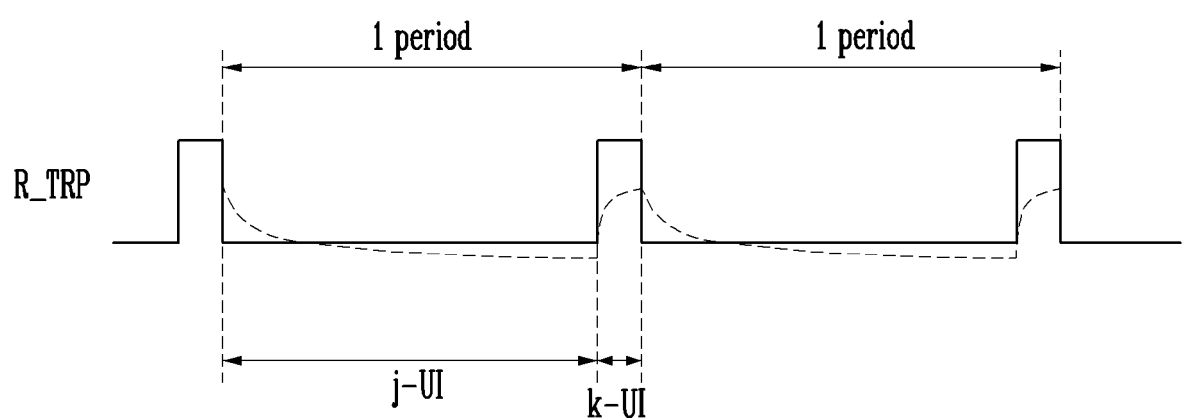
FIG. 17 is a view illustrating the more effective elimination of inter-symbol interference when using an example second training pattern signal.

FIG. 16 is a view illustrating the more effective elimination of inter-symbol interference when using an example first training pattern signal, and FIG. 17 is a view illustrating the more effective elimination of inter-symbol interference when using an example second training pattern signal.

Referring to FIGS. 16 and 17, solid lines represent first and second training pattern signals (F_TRP, R_TRP) in an ideal case, while broken lines represent first and second training pattern signals (F_TRP, R_TRP) in an actual case.

Referring to FIGS. 16 and 17, one period of the first and second training pattern signals (F_TRP, R_TRP) may be j+k-UI, and a binary level during j-UI may be different from a binary level during k-UI. Here, j and k may be a natural number.

According to some example embodiments, k may be equal to 1. In this case, because no transition occurs during j-UI and voltage is accumulated in the channel, first or second transition may not occur sufficiently during short k-UI. That is, the first and second training pattern signals (F_TRP, R_TRP) of FIGS. 16 and 17 may be the worst case in terms of inter-symbol interference.

When the phase of the sampling clock signal is determined according to the above-mentioned embodiments, based on the first and second training pattern signals (F_TRP, R_TRP), it may be possible to obtain the phase of the sampling clock signal that is resistant to both the crosstalk-induced jitter and the inter-symbol interference.

According to some example embodiments, because it is unnecessary to apply pre-emphasis technique to the transmitting unit (TX1-TX(2n-1)), configuration cost thereof may be reduced.

As described above, the present disclosure provides a receiver and a transceiver including the receiver, capable of minimizing a chip area of a clock data recovery unit while effectively eliminating a crosstalk-induced jitter and inter-symbol interference.

Aspects of some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A receiver comprising:
a plurality of receiving units connected with corresponding channels; and
a clock data recovery unit connected with a sensing channel among the channels via a sensing line, and connected with the receiving units via a common clock line,
wherein the receiving units are configured to receive training pattern signals having the same transition direction through the channels in a training mode, and
in the training mode, the clock data recovery unit is configured to generate a phase-adjusted sampling clock signal so that a sampling time corresponds to a transition time of a training pattern signal of the sensing channel.

2. The receiver according to claim 1, wherein the clock data recovery unit is configured to supply the sampling clock signal through the common clock line to the receiving units in a normal mode, and
the receiving units are configured to sample each of data signals received through the corresponding channels using the sampling clock signal in the normal mode.

3. The receiver according to claim 2, wherein the clock data recovery unit comprises a transition detection unit configured to provide a mode signal corresponding to the training mode or the normal mode, based on the training pattern signal and a compensated clock signal.

4. The receiver according to claim 3, wherein the clock data recovery unit further comprises a phase correction unit configured to generate at least one of the compensated clock signal and the sampling clock signal, based on the mode signal and an external clock signal.

5. The receiver according to claim 4, wherein the transition detection unit is configured to provide the mode signal corresponding to the training mode when the training pattern signal is inputted, and
the phase correction unit is configured to correct a phase of the external clock signal to generate the compensated clock signal when the mode signal corresponding to the training mode is inputted.

6. The receiver according to claim 5, wherein the transition detection unit is configured to provide the mode signal corresponding to the normal mode in the case of success in detecting the transition time of the training pattern signal based on the compensated clock signal, in the training mode, and the transition detection unit is configured to provide the mode signal corresponding to the training mode in the case of failing in detecting the transition time of the training pattern signal based on the compensated clock signal, in the training mode.

7. The receiver according to claim 6, wherein the phase correction unit is configured to re-correct the phase of the external clock signal to generate the compensated clock signal when the training mode is maintained, and the phase correction unit is configured to generate the sampling clock signal having the same phase as a current compensated clock signal when the training mode is terminated and the normal mode is started.

8. The receiver according to claim 2, wherein the sensing channel is a channel that receives a receiving signal having the slowest phase for the same transmitting signals among the channels.

9. The receiver according to claim 2, wherein the sensing channel is a channel that is located in the middle of the channels.

10. The receiver according to claim 8, wherein each of the receiving units comprises:
a first comparator configured to compare the data signal with a first reference voltage in response to the sampling clock signal, thus providing a logic value;
a second comparator configured to compare the data signal with a second reference voltage in response to the sampling clock signal, thus providing a logic value; and
a multiplexer configured to output one of output values of the first and second comparators, as current data.

11. The receiver according to claim 10, wherein the multiplexer is configured to select one of the output values of the first and second comparators based on past data before a 1UI (unit interval), thus outputting the output value as the current data.

12. The receiver according to claim 11, wherein the first reference voltage has a value between the highest level and an intermediate level among variable levels of the data signal, and
the second reference voltage has a value between the lowest level and the intermediate level among variable levels of the data signal.

13. The receiver according to claim 12, wherein the first comparator is configured to provide a high level of logic value if the data signal is larger than the first reference voltage, and to provide a low level of logic value if the data signal is smaller than the first reference voltage, and
the second comparator is configured to provide a high level of logic value if the data signal is larger than the second reference voltage, and to provide a low level of logic value if the data signal is smaller than the second reference voltage.

14. The receiver according to claim 13, wherein a binary level of the current data is 1 when the output value of the multiplexer is the high level of logic value, and
a binary level of the current data is 0 when the output value of the multiplexer is the low level of logic value.

15. The receiver according to claim 2, wherein the receiving signal is a duo-binary signal.

16. A receiver comprising:
a plurality of receiving units connected with corresponding channels; and
a clock data recovery unit connected with a sensing channel among the channels via a sensing line, and connected with the receiving units via a common clock line,
wherein the receiving units are configured to receive first training pattern signals having the same first transition direction and second training pattern signals having the same second transition direction through the channels in a training mode,
the clock data recovery unit is configured to generate a sampling clock signal to correspond to a more delayed phase among a first sampling time corresponding to a first transition time of a first training pattern signal and a second sampling time corresponding to a second transition time of a second training pattern signal of the sensing channel in the training mode,
the first transition direction and the second transition direction are different from each other.

17. The receiver according to claim 16, wherein the clock data recovery unit is configured to supply the sampling clock signal through the common clock line to the receiving units in a normal mode, and
the receiving units sample each of data signals received through the corresponding channels using the sampling clock signal in the normal mode.

18. A transceiver comprising:
a plurality of transmitting units connected with corresponding channels;
a plurality of receiving units connected with the corresponding channels; and
a clock data recovery unit connected with a sensing channel among the channels via a sensing line, connected with the receiving units via a common clock line, and connected with the transmitting units via a common mode line,
wherein the receiving units are configured to receive training pattern signals having the same transition direction through the channels in a training mode, and
in the training mode, the clock data recovery unit is configured to generate a phase-adjusted sampling clock signal so that a sampling time corresponds to a transition time of a training pattern signal of the sensing channel, and to provide a mode signal corresponding to a normal mode through the common mode line when the sampling clock signal is generated, and
the transmitting units are configured to provide each data signal through the corresponding channels, in the case of receiving the mode signal corresponding to the normal mode.

19. The transceiver according to claim 18, wherein the clock data recovery unit is configured to supply the sampling clock signal through the common clock line to the receiving units in the normal mode, and
the receiving units are configured to sample each of the data signals received through the corresponding channels using the sampling clock signal in the normal mode.

* * * * *